US008625761B2

(12) United States Patent
Fujii et al.

(10) Patent No.: US 8,625,761 B2
(45) Date of Patent: Jan. 7, 2014

(54) METHOD, SYSTEM, APPARATUS, AND COMPUTER PROGRAM PRODUCT FOR USER AUTHENTICATION

(75) Inventors: Haruhiko Fujii, Tokyo (JP); Tetsuya Nakagawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1284 days.

(21) Appl. No.: 12/304,648

(22) PCT Filed: Jul. 6, 2007

(86) PCT No.: PCT/JP2007/063589
§ 371 (c)(1),
(2), (4) Date: Dec. 12, 2008

(87) PCT Pub. No.: WO2008/004671
PCT Pub. Date: Jan. 10, 2008

(65) Prior Publication Data
US 2009/0304162 A1    Dec. 10, 2009

(30) Foreign Application Priority Data

Jul. 7, 2006    (JP) ................................. 2006-188489

(51) Int. Cl.
*H04M 1/56*    (2006.01)
*H04M 3/42*    (2006.01)
*H04M 11/00*    (2006.01)
*H04M 1/66*    (2006.01)

(52) U.S. Cl.
USPC ............ 379/142.05; 379/142.06; 379/210.01; 379/93.02; 455/411

(58) Field of Classification Search
USPC ............. 379/142.01, 142.04–142.06, 210.01, 379/201.01, 93.12, 93.01–93.03; 455/414.1, 415, 410–411; 705/42, 44
See application file for complete search history.

(56) References Cited

U.S. PATENT DOCUMENTS

| 5,315,634 | A | 5/1994 | Tanaka et al. |
| 6,782,080 | B2 * | 8/2004 | Leivo et al. ................ 379/93.04 |
| 2002/0029246 | A1 * | 3/2002 | Kumagai ...................... 709/205 |
| 2003/0046541 | A1 | 3/2003 | Gerdes et al. |
| 2007/0190976 | A1 * | 8/2007 | Hoshino et al. ............... 455/411 |

FOREIGN PATENT DOCUMENTS

| EP | 1 288 765 | 3/2005 |
| JP | 3 179863 | 8/1991 |
| JP | 10 198636 | 7/1998 |
| JP | 3497799 | 11/2003 |
| JP | 2004 501460 | 1/2004 |
| JP | 2006 33780 | 2/2006 |
| WO | WO 2005088952 A1 * | 9/2005 |

\* cited by examiner

*Primary Examiner* — Wesley Kim
*Assistant Examiner* — Nam Huynh
(74) *Attorney, Agent, or Firm* — Oblon, Spivak, McClelland, Maier & Neustadt, L.L.P.

(57) ABSTRACT

A user authentication method is applied to a user authentication apparatus for authentication using a unique ID that is information unique to a communication apparatus. The method includes acquiring a user ID as information identifying a user, and detecting a unique ID corresponding to the user ID from a user ID list. The method also includes making a call with a predetermined number of rings to a communication apparatus having the unique ID. Additionally, the method includes receiving a callback made by a communication apparatus after a predetermined number of rings of the call in response to the call. In addition, the method includes determining whether a unique ID of the communication apparatus having made the callback matches the unique ID of the communication apparatus to which the call has been made, and determining, if there is a match, that a user having the user ID is an authorized user.

11 Claims, 7 Drawing Sheets

US 8,625,761 B2

METHOD, SYSTEM, APPARATUS, AND COMPUTER PROGRAM PRODUCT FOR USER AUTHENTICATION

TECHNICAL FIELD

The present invention relates to a method, system, apparatus, and computer program product for user authentication.

BACKGROUND ART

Technologies have been developed that uses a unique ID of a communication apparatus, such as a calling number of a portable telephone, for user authentication. For example, Patent Document 1 discloses a technology that a service system for providing services to a user stores therein a user ID and a calling number of a portable telephone in an associated manner as a user ID matching list, and that determines that the user is an authorized user, when a user ID and a calling number are acquired from a user terminal and a portable telephone, respectively, and a pair of the user ID and the calling number thus acquired has been stored in the user ID list.

Patent Document 1: Japanese Patent No. 3497799

DISCLOSURE OF INVENTION

Problem to be Solved by the Invention

Such conventional technologies, however, require entry of a telephone number for calling a service system every time the user uses the service system. This causes problems such as placing a heavy burden on the user and error entry.

The present invention has been achieved to solve the above problems in the conventional technology and it is an object of the present invention to provide a method, system, apparatus, and computer program product for user authentication that reduce the number of times a user operates a communication apparatus for authentication, thereby enabling to reduce the user's burden.

Means for Solving Problem

The following describes a configuration for achieving the above object. As shown in FIG. 1, a user authentication system provides service systems 4, 5, and 6, connected via a network 3 to a terminal 8 operated by a user 1 and providing services to the user 1, with authentication of the user 1 operating the terminal 8 as an authorized user. In the user authentication system, a user communication apparatus 11 is prepared that includes: a unique ID storage module 11a that stores therein a unique ID indicating being an authorized user so as not to be easily rewritten by unauthorized operation; and a callback module 11b that notifies, upon receiving a call from the service systems via a predetermined network 12 having tapping and tamper-proof functions, the incoming call to the user 1, and that returns, when the user 1 does not answer the call after a predetermined number of rings and then instructs to make a callback, the unique ID stored in the unique ID storage module 11a to the service systems. Between the network 12 and the service systems 4, 5, and 6 are provided system communication apparatuses 13, 14, and 15 that make a call with a predetermined number of rings to the user communication apparatus 11, receive the unique ID returned by a callback from the user communication apparatus 11 after the call, and transfer the unique ID to the service systems 4, 5, and 6. The service systems 4, 5, and 6 store therein user ID matching lists 4b, 5b, and 6b that respectively indicate corresponding relationships between the information identifying the user, i.e., user ID, and the unique ID. When the user 1 enters a user ID via the terminal 8 to use a service system, for example, the service system 4, a call module 4d of the service system 4 detects a unique ID corresponding to the user ID from the user ID matching list 4b, randomly selects an originating number from among X number of originating numbers with an originating number selector 4c, and causes the system communication apparatus 13 to make a call with a predetermined number of rings to the unique ID of the user communication apparatus 11 via the network 12, using the selected originating number. After a predetermined number of rings, when the user communication apparatus 11 returns the unique ID by a callback to the system communication apparatus 13 via the network 12, the service system 4 determines whether the unique ID transferred from the system communication apparatus 13 matches the unique ID of the user communication apparatus 11 to which the call has been made. If there is a match, the user 1 operating the terminal 8 is regarded as an authorized user, and the services are provided to the terminal 8.

With this configuration, the unique ID is stored in the storage module that is not easily rewritten by unauthorized operation, and the tapping and tamper-proof functions are added to channels. This prevents falsification of the unique ID, and fraudulent use of the system by a third party spoofing a user relatively easily, as in password systems. Further, the unique ID can be sent to a system communication apparatus that supports a certain service system. This enables login to a plurality of systems with a single user communication apparatus. There is no need to prepare a physical medium and a device for reading the medium at each system or terminal, as required in authentication systems using conventional physical media. Further, because the user communication apparatus sends the unique ID by making a callback to the originating number used to make the call by the system communication apparatus, the user need not enter the originating number.

The predetermined number of rings of the call to the user communication apparatus 11 is less than the number of rings after which the call is to be transferred to another user communication apparatus. By limiting the call within a predetermined number of rings, it is possible to prevent the call from being transferred to an unauthorized communication apparatus. This prevents that an unauthorized user having obtained the user ID illegally transfers the call made to the user communication apparatus 11 and uses the services illegally.

FIG. 2 shows a user authentication system that provides service systems 24, 25, and 26, connected via the network 3 to the terminal 8 operated by the user 1 and providing services to the user 1, with authentication of the user 1 operating the terminal 8 as an authorized user. In the user authentication system, the user communication apparatus 11 is prepared that includes: the unique ID storage module 11a that stores therein a unique ID indicating being an authorized user so as not to be easily rewritten by unauthorized operation; and the callback module 11b that notifies, upon receiving a call from the service systems via the predetermined network 12 having tapping and tamper-proof functions, the incoming call to the user 1, and that returns, when the user 1 does not answer the call after a predetermined number of rings and then instructs to make a callback, the unique ID stored in the unique ID storage module 11a to the service systems. Between the network 12 and the service systems 24, 25, and 26 is provided an authentication apparatus 51 including a call module 51d that stores therein a user ID matching list 5ib indicating a corresponding relationship between the information identifying the user, i.e., user ID, and the unique ID, makes a call with a predetermined number of rings to the user communication apparatus 11 based on an authentication request from the service systems 24, 25, and 26, using an originating number randomly selected from among X number of originating numbers with an originating number selector 51c, receives the unique ID returned by a callback from the user communication apparatus 11 after the call, and authenticates the user. When the user 1 enters a user ID via the terminal 8 to use a service system, for example, the service system 4, an authentication module 24b of the service system 24 requests the authentication apparatus 51 to authenticate the user. The call module 51d of the authentication apparatus 51 detects a unique ID corresponding to the user ID from the user ID matching list 51b, randomly selects an originating number from among X number of originating numbers with the originating number selector 51c, and makes a call with a predetermined number of rings to the unique ID of the user communication apparatus 11 via the network 12, using the selected originating number. After a predetermined number of rings, when the user communication apparatus 11 returns the unique ID by a callback via the network 12, the call module 51d determines whether the returned unique ID matches the unique ID to which the call has been made. If there is a match, the call module 51d notifies the authentication module 24b of the service system 24 that the user 1 operating the terminal 8 is an authorized user.

With this configuration, the unique ID is stored in the storage module that is not easily rewritten by unauthorized operation, and the tapping and tamper-proof functions are added to channels. This prevents falsification of the unique ID, and fraudulent use of the system by a third party spoofing a user relatively easily, as in password systems. Further, the unique ID can be sent to a system communication apparatus that supports a certain service system. This enables login to a plurality of systems with a single user communication apparatus. There is no need to prepare a physical medium and a device for reading the medium at each system or terminal, as required in authentication systems using conventional physical media. Further, because the user communication apparatus returns the unique ID to the authentication apparatus by making a callback, a user need not enter the originating number.

EFFECT OF THE INVENTION

According to an aspect of the present invention, a user only makes a callback for authentication. This eliminates the need to enter an originating number, thus reducing the user's burden for authentication.

Figure 1:
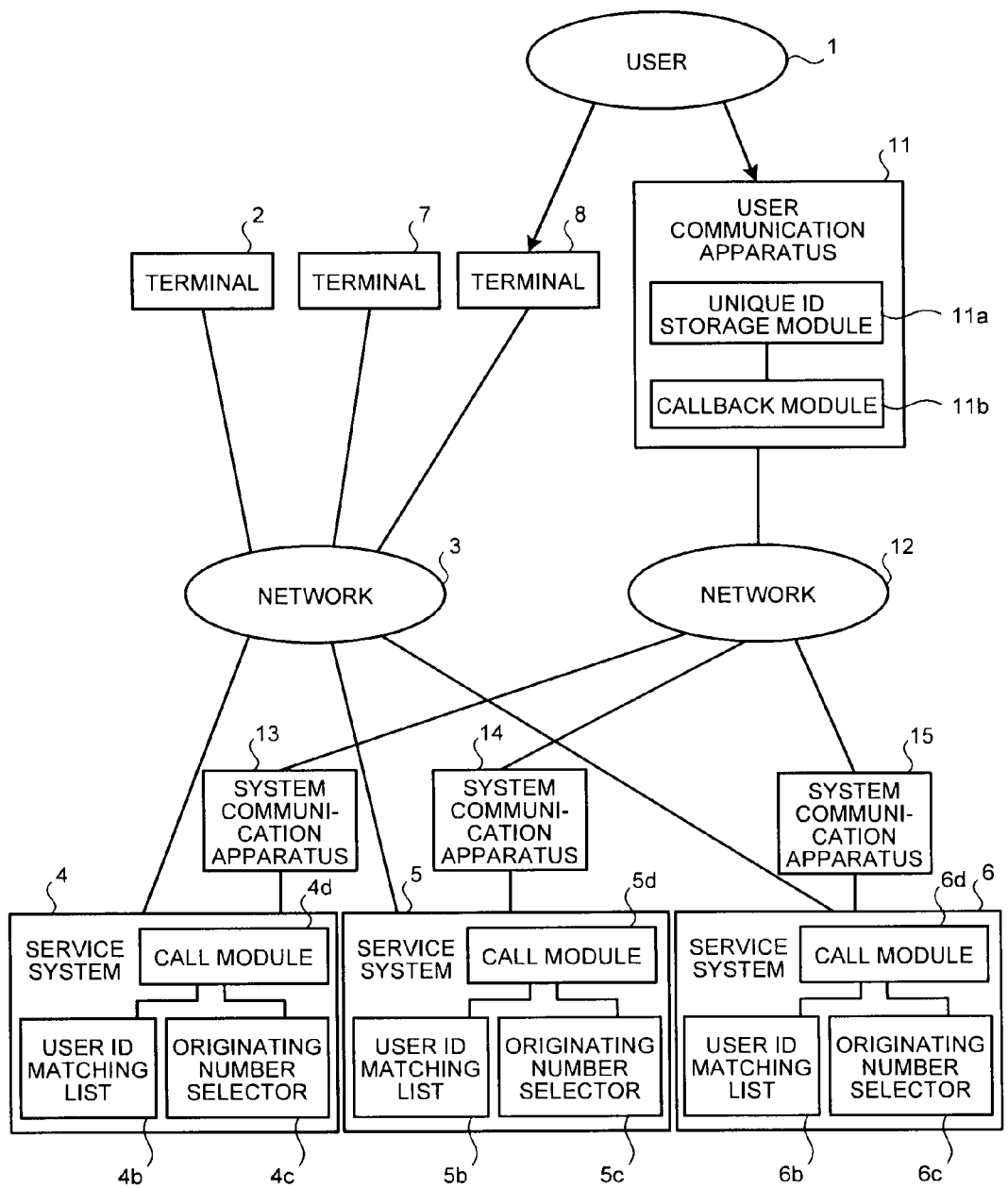
FIG. 1 is a schematic diagram of a user authentication system according to the present invention.
Figure 2:
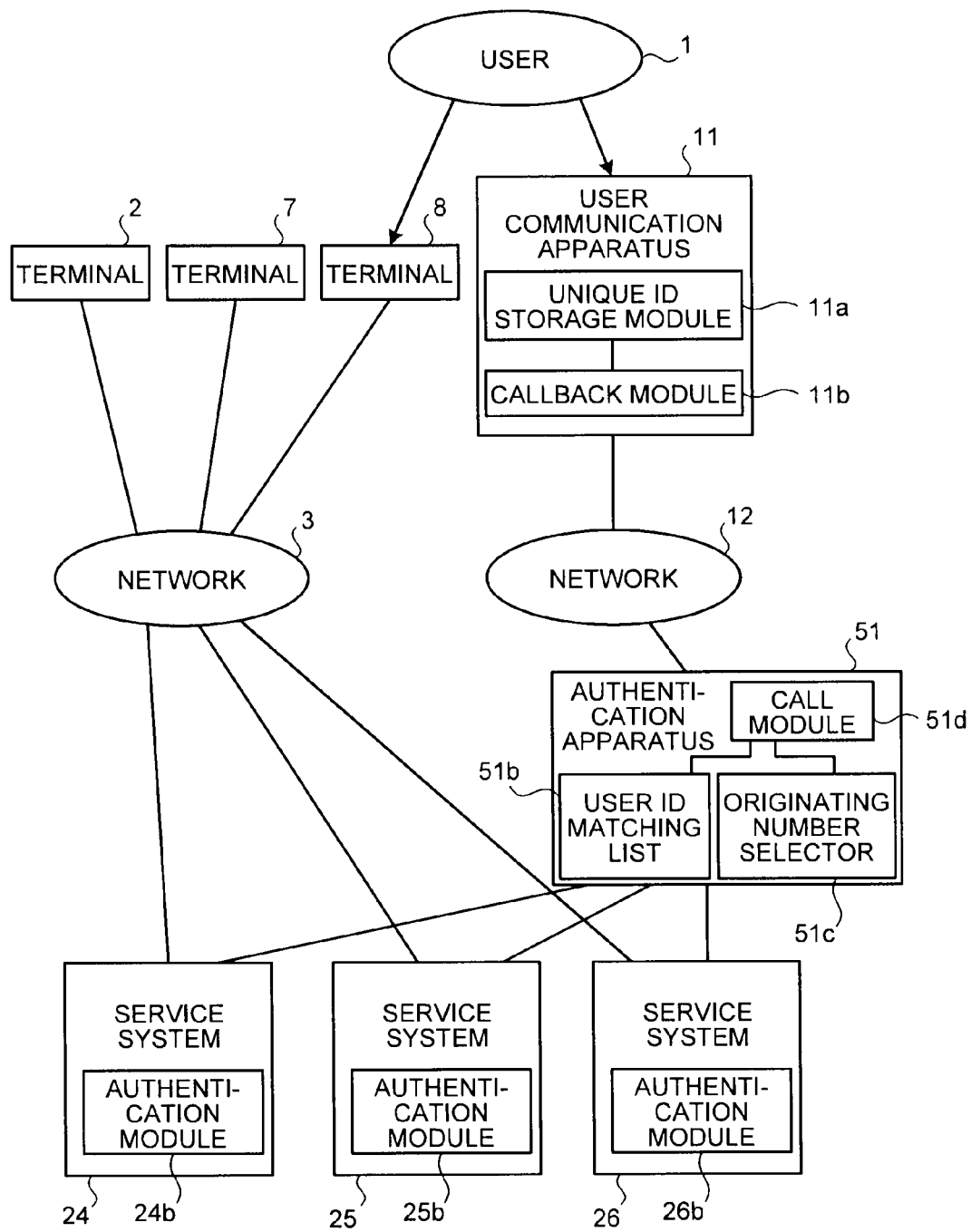
FIG. 2 is another schematic diagram of a user authentication system according to the present invention.

EXPLANATIONS OF LETTERS OR NUMERALS 1, 61 user
2, 7, 8 terminal
3, 12 network
4-6, 24-26 service system
4b-6b user ID matching list
4c-6c originating number selector
4d-6d call module
11 user communication apparatus
11a unique ID storage module
11b callback module
13-15 system communication apparatus
24b-26b authentication module
51 authentication apparatus
51b user ID matching list
51c originating number selector
51d call module
62, 63 PC (personal computer)
64 UNIX (registered trademark) (UNIX (registered trademark) workstation)
65 internet
66 file server
66b-68b user ID matching list
66c-68c originating number selector
66d-68d call module
67, 68 WEB service provider server
71 portable telephone
71a user number storage module
71b callback module
72 wireless network
73 public telephone network
74, 75 modem with originating number receiving function
76 authentication server
76b user ID matching list
76c originating number selector
76d call module
86 file server
86b-88b authentication module
87, 88 WEB service provider server
100 computer
110 RAM
111 user authentication program
120 CPU
121 user authentication process
130 HDD
140 LAN interface
150 input/output interface
160 DVD drive

BEST MODE(S) FOR CARRYING OUT THE INVENTION

Exemplary embodiments of a method, system, apparatus, and computer program for user authentication according to the present invention will be described with reference to the accompanying drawings. A first embodiment describes an arrangement that a service system authenticates a user, and a second embodiment describes an arrangement that a service system requests an authentication apparatus to perform user authentication.

[First Embodiment]

Figure 3:
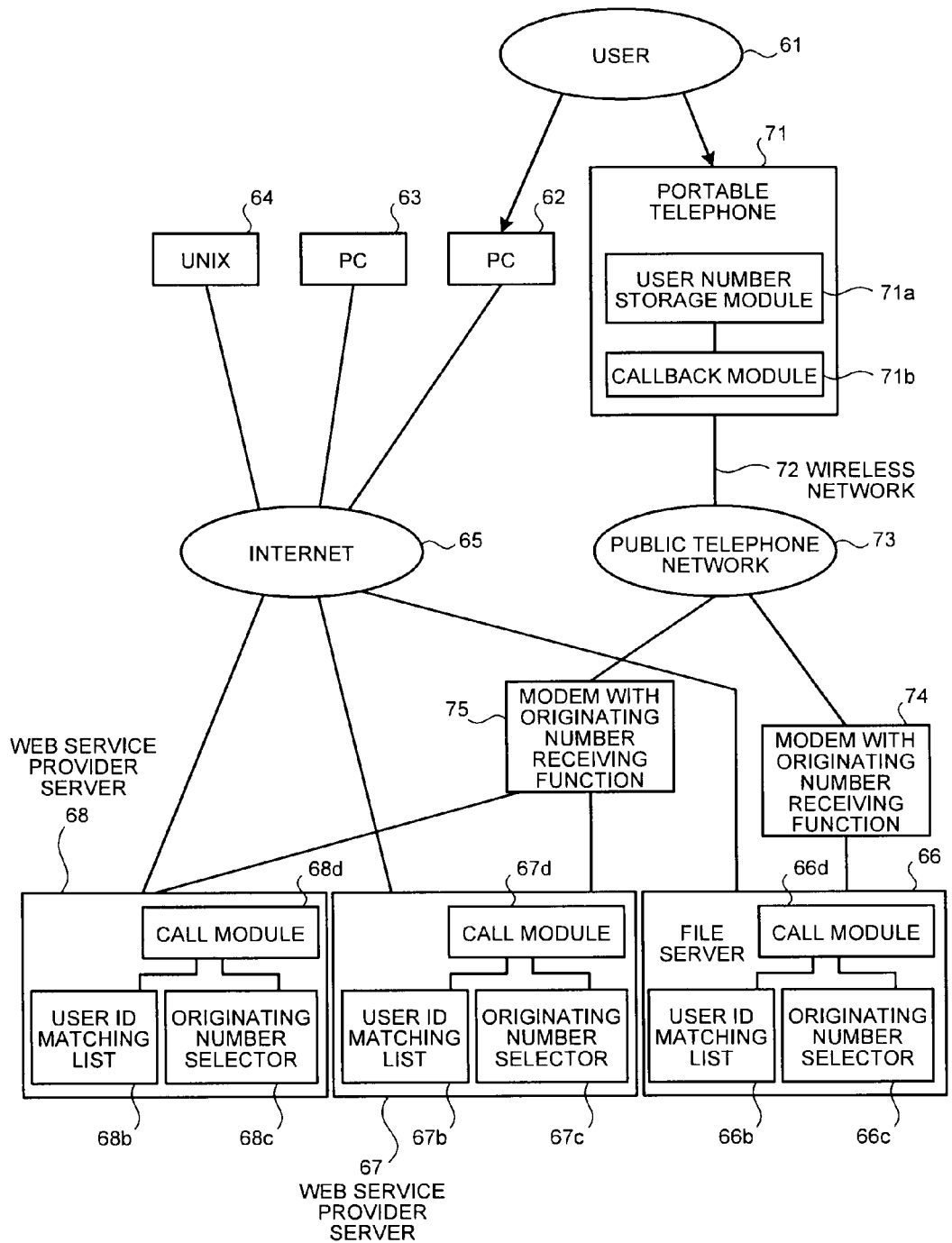
FIG. 3 is a schematic diagram of a user authentication system according to a first embodiment.

The following describes a configuration of a user authentication system according to a first embodiment. FIG. 3 is a schematic diagram of a user authentication system according to the first embodiment. In FIG. 3, indicated by 61 is a user, 62 and 63 are personal computers (PC) serving as terminals, 64 is a uniplexed information and computing system (UNIX) (registered trademark) workstation (UNIX (registered trademark)) serving as a terminal, 65 is an internet as a network, 66 is a file server as a service system, and 67 and 68 are WEB service provider servers as service systems.

Further, indicated by 71 is a portable telephone serving as a user communication apparatus, 72 and 73 are respectively a wireless network and a public telephone network serving as predetermined networks, and 74 and 75 are modems with originating number receiving function both serving as system communication apparatuses (note that the modem 75 is shared by the WEB service provider servers 67 and 68).

A user number storage module 71a within a portable telephone 71 is used as a unique ID storage module. Specifically, a telephone number (originating number) stored in the user number storage module 71a is used as a unique ID. The portable telephone 71 includes a callback module 71b that makes a callback to an incoming call. The wireless network 72 and the public telephone network 73 have tapping and tamper-proof functions for communication. The modems 74 and 75 with originating number receiving function serve to read a telephone number of an incoming call and transfer the call.

The file server 66 and the WEB service provider servers 67 and 68 respectively include: user ID matching lists 66b, 67b, and 68b indicating corresponding relationships between user IDs and unique IDs (originating numbers); call modules 66d, 67d, and 68d that make a call with a predetermined number of rings to the portable telephone 71 via the modems 74 and 75 with originating number receiving function; and originating number selectors 66c, 67c, and 68c that randomly select an originating number from among X number of telephone numbers stored in the servers.

The call modules 66d, 67d, and 68d randomly select one originating number with the originating number selectors 66c, 67c, and 68c, respectively, make a call with a predetermined number of rings using the number, and disconnect the call. The predetermined number is less than the number of rings after which the call is to be transferred to another portable telephone, for example one time. The ringing sound of the call may be "XX bank logs in".

When the call is not answered by the user 61 and a callback is made from the portable telephone 71 after a predetermined number of rings, the call modules 66d, 67d, and 68d determine whether the originating number of the callback matches the number to which the call has been made. If there is a match, the call modules 66d, 67d, and 68d send a talkie message (automatic voice guidance). As a talkie message, "This is XX bank. If you want to login, please dial 1#" is sent. When characters are returned from the portable telephone 71, the call modules 66d, 67d, and 68d determine whether the characters match "1#", and determine, if there is a match, that the user 61 is an authorized user.

As such, by combining the originating number of the callback and the specified characters thus returned, it is possible to prevent operating error of the user 61 and improve reliability of authentication. When the user 61 answers the call within a predetermined number of rings, the call is immediately disconnected. Alternatively, other authentication systems may be used. Although "1#" is specified as a talkie message in the foregoing, other characters and character strings may be specified. The "characters" include "symbols" and "numbers".

By causing the call modules 66d, 67d, and 68d to make a call to the portable telephone 71, the user 61 can perform authentication only by making a callback. Further, the call modules 66d, 67d, and 68d randomly select one originating number with the originating number selectors 66c, 67c and 68c, respectively, and make a call using the number. This makes it difficult to identify a recipient of the callback, even when an attacker to the service systems can illegally steel the user ID and forges the originating number. In this way, it is possible to reduce the possibility that the service systems are attacked.

Figure 4:
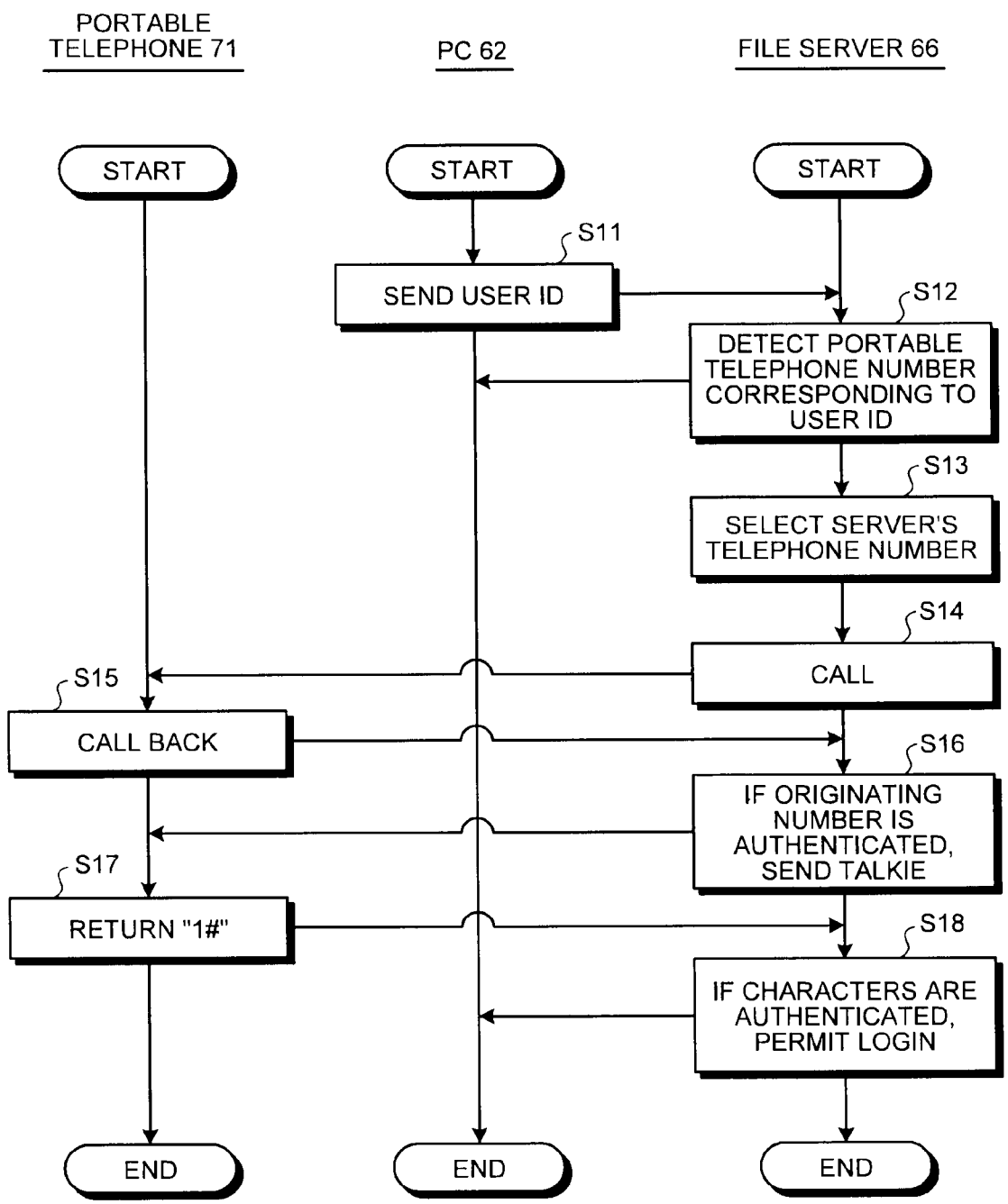
FIG. 4 is a flowchart of a procedure of a user authentication process performed by the user authentication system according to the first embodiment.

The following describes a procedure of a user authentication process performed by the user authentication system according to the first embodiment. FIG. 4 is a flowchart of a procedure of a user authentication process performed by a user authentication system according to the first embodiment. As an example, an arrangement is described in which the user 61 accesses the file server 66 on the internet 65 by using the PC 62.

As shown in FIG. 4, in the user authentication process, when the user 61 enters a user ID on the PC 62, the PC 62 sends the user ID to the file server 66 via the internet 65 (Step S11).

Upon receiving the user ID, the call module 66d of the file server 66 detects a portable telephone number corresponding to the user ID from the user ID matching list 66b (Step S12), and randomly selects one originating number from among X number of originating numbers with the originating number selector 66c (Step S13).

Using the selected originating number, the call module 66d makes a call with a predetermined number of rings to the portable telephone 71 via the modem 74 with originating number receiving function (Step S14). After a predetermined number of rings, when the user 61 instructs to make a callback, the callback module 71b of the portable telephone 71 makes a callback (Step S15). Accordingly, the call module 66d receives an originating number of the callback via the modem 74 with originating number receiving function, and determines whether it matches an originating number to which the call has been made. If there is a match, the call module 66d sends a talkie message (Step S16).

When the user 61 hears the talkie message and dials characters and the portable telephone 71 returns the characters (Step S17), determination is made as to whether the returned characters match the characters specified in the talkie message ("1#"). If there is a match, login permission is given to the PC 62 (Step S18).

As such, upon receiving the user ID, the call module 66d of the file server 66 makes a call to the portable telephone 71 via the modem 74 with originating number receiving function. This enables the user 61 to perform authentication only by making a callback, thus reducing the burden on the user 61 for user authentication.

As described above, in the first embodiment, upon receiving the user ID, the call modules 66d, 67d, and 68d acquire a portable telephone number corresponding to the user ID by using the user ID matching lists 66b, 67b, and 68b, respectively, randomly select one originating number with the originating number selectors 66c, 67c, and 68c, respectively, and make a call with a predetermined number of rings to the portable telephone 71 that corresponds to the user ID, by using the selected originating number and via the modems 74 and 75 with originating number receiving function. After a predetermined number of rings, when the callback module 71b of the portable telephone 71 makes a callback based on the instruction from the user 61, the call modules 66d, 67d, and 68d perform user authentication based on whether the originating number of the callback received via the modems 74 and 75 with originating number receiving function matches a telephone number to which the call has been made, and whether the characters are returned that have been specified to be returned in the talkie message. This enables the user 61 to perform authentication only by making a callback, thus reducing the user's burden.

In the forgoing, if the originating number of the callback matches the telephone number to which the call has been made, the talkie message is sent. Then, authentication is performed based on whether the characters are returned that have been specified to be returned in the talkie message. Without sending the talkie message, the user may be determined to be an authorized user when the originating number of the callback matches the telephone number to which the call has been made.

In the foregoing, when the user 61 answers the call within a predetermined number of rings made to the portable telephone 71, the call is immediately disconnected. The call may be disconnected after issuing such guidance, "Please hang up and call back. Even if you don't answer this call, the ringing sound will stop within about 10 seconds. Next time, please wait until the ringing sound stops and call back."

In the foregoing, a predetermined number of rings are made to the portable telephone 71. To securely record incoming call history to the portable telephone 71, the calling needs to be made for a certain amount of time. The longer the calling is made, the more likely the user 61 answers the call by mistake. If authentication is performed with this call, the authentication using the originating number (authentication by callback) cannot be performed, and the security is reduced. Thus, the call may be disconnected by keeping the call ringing until the user 61 answers the call, and then by issuing such guidance "Please hang up and call back" when the user 61 answers the call. In this way, even when the user 61 answers the call after the first ring, the telephone number of the service system is only notified (incoming call history is recorded) without performing authentication. By making the user 61 call back, authentication using an originating number is realized with improved security.

[Second Embodiment]

The first embodiment describes user authentication performed by each service system. User authentication can also be performed using an authentication apparatus that performs user authentication in response to a user authentication request from a service system. A second embodiment describes an authentication apparatus that performs user authentication in response to a user authentication request from a service system.

Figure 5:
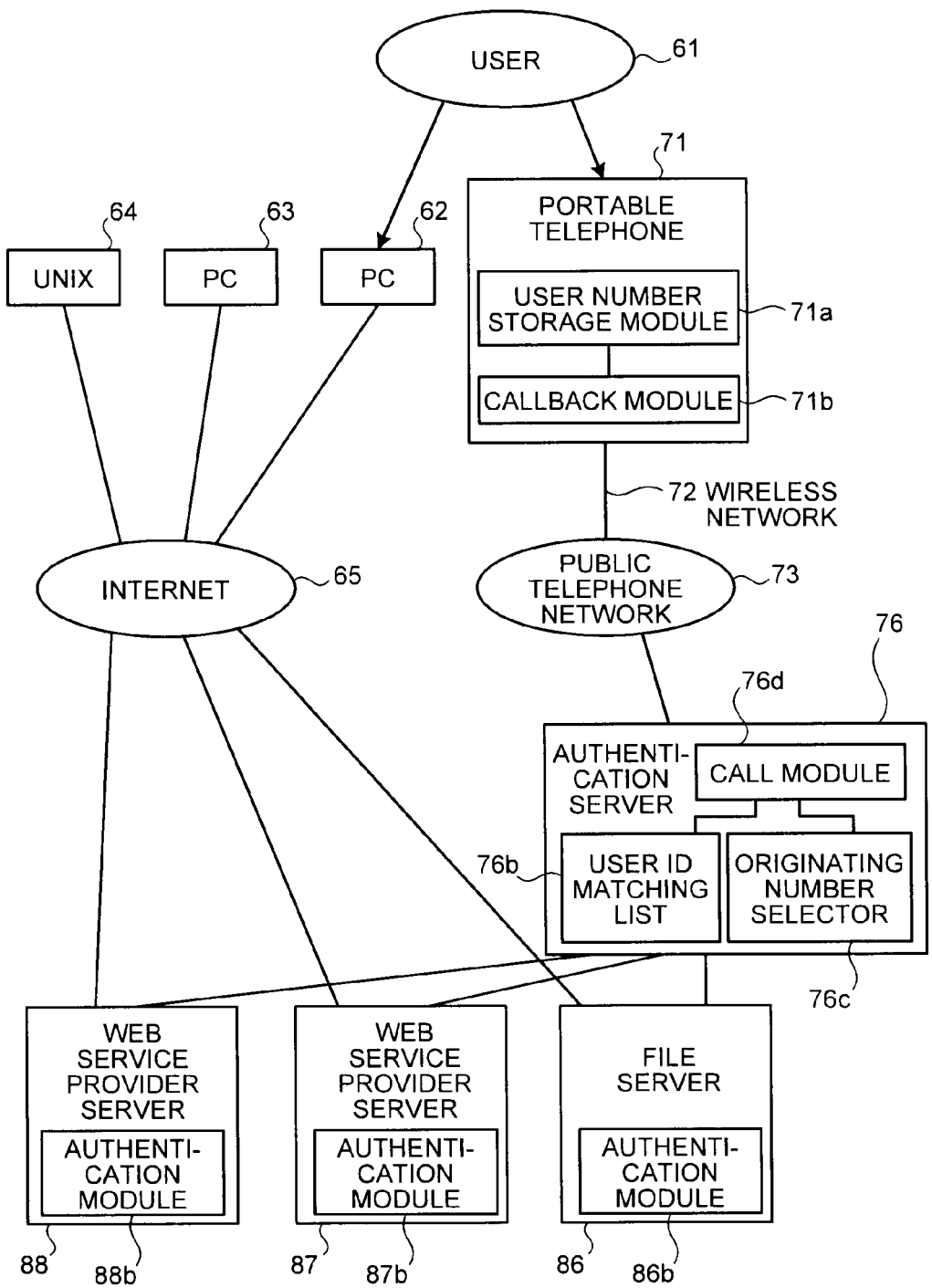
FIG. 5 is a schematic diagram of a user authentication system according to a second embodiment.

The following describes a configuration of a user authentication system according the second embodiment. FIG. 5 is a schematic diagram of a user authentication system according to the second embodiment. For ease of description, functional elements serving as those shown in FIG. 3 are indicated by the same reference numerals, and descriptions thereof are omitted.

As shown in FIG. 5, the user authentication system includes: a file server 86 instead of the file server 66 serving as a service system; and WEB service provider servers 87 and 88 instead of the WEB service provider servers 67 and 68 serving as service systems. The user authentication system includes an authentication server 76 that performs user authentication in response to a user authentication request from each service system. Each service system and the authentication server 76 are connected via a network such as a virtual private network (VPN) that provides improved security.

The file server 86 and the WEB service provider servers 87 and 88 include authentication modules 86b, 87b, and 88b, respectively. Upon receiving a user ID, the authentication modules 86b, 87b, and 88b specify the user ID and request the authentication server 76 to perform user authentication, and determines whether to provide services to the user based on a result of the authentication performed by the authentication server 76.

The authentication server 76 includes a user ID matching list 76b, an originating number selector 76c, and a call module 76d. Upon receiving the authentication request and the user ID from the service system, the call module 76d detects a telephone number corresponding to the user ID from the user ID matching list 76b, randomly selects an originating number from among X number of originating numbers with the originating number selector 76c, and makes a call with a predetermined number of rings to the portable telephone 71 by using the selected originating number.

When the call is not answered by the user 61 and a callback is made from the portable telephone 71 after a predetermined number of rings, the call module 76d determines whether an originating number of the callback matches a number to which the call has been made. If there is a match, the call module 76d sends a talkie message to the portable telephone 71. As a talkie message, "This is XX bank. If you want to login, please dial 1#" is sent. When characters are returned from the portable telephone 71, the call module 76d performs user authentication based on whether the characters match "1#", and notifies a result of the authentication to the service system having made the request.

Figure 6:
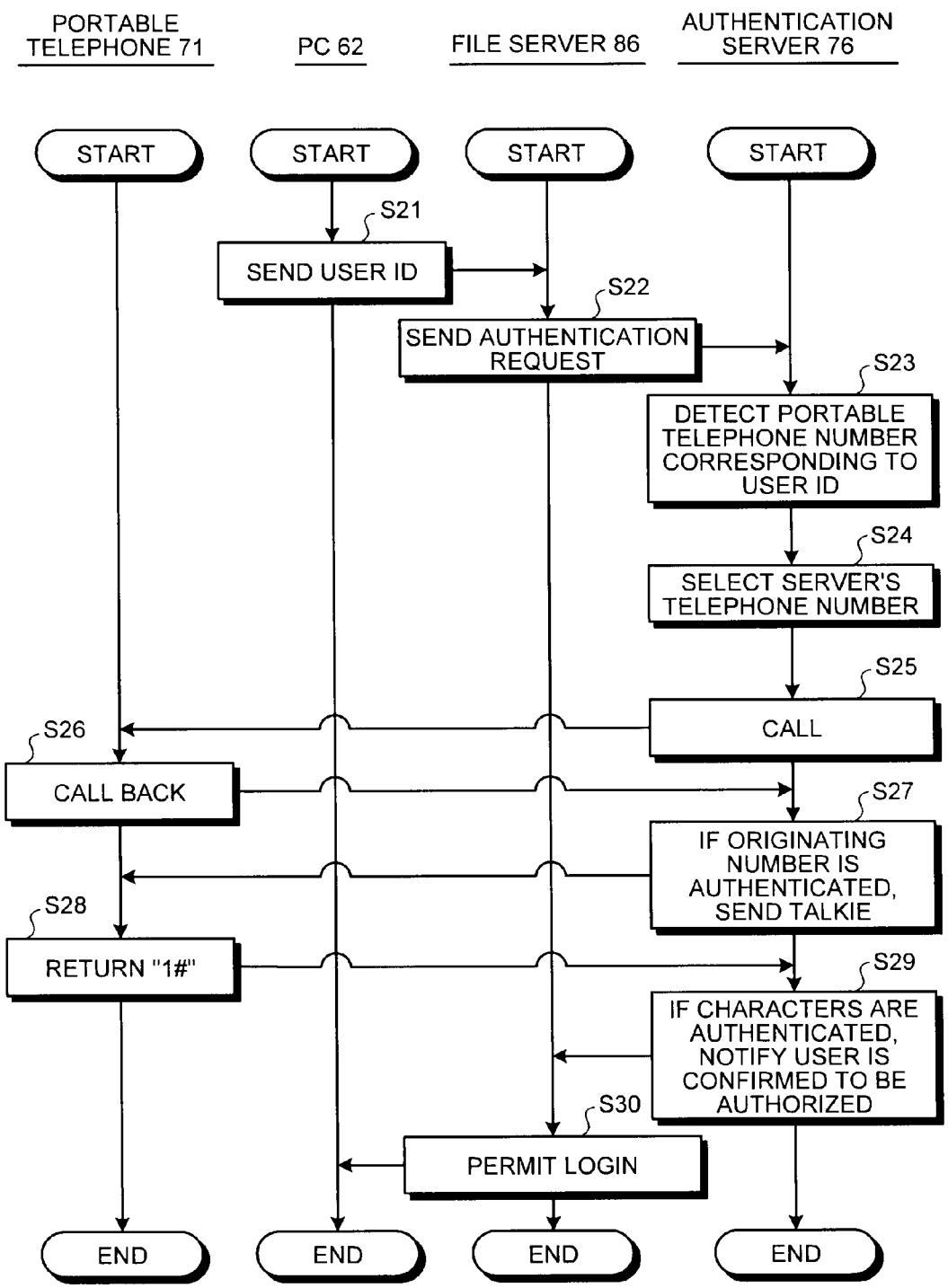
FIG. 6 is a flowchart of a procedure of a user authentication process performed by the user authentication system according to the second embodiment.

The following describes a procedure of a user authentication process performed by a user authentication system according to the second embodiment. FIG. 6 is a flowchart of a procedure of a user authentication process performed by the user authentication system according to the second embodiment. As an example, an arrangement is described in which the user 61 accesses the file server 86 on the internet 65 by using the PC 62.

As shown in FIG. 6, in the user authentication process, when the user 61 enters the user ID on the PC 62, the PC 62 sends the user ID to the file server 86 via the internet 65 (Step S21).

Upon receiving the user ID, the authentication module 86b of the file server 86 sends a user authentication request to the authentication server 76 (Step S22). Upon receiving the user authentication request, the call module 76d of the authentication server 76 detects a portable telephone number corresponding to the user ID from the user ID matching list 76b (Step S23), and randomly selects one originating number from among X number of originating numbers with the originating number selector 76c (Step S24).

Using the selected originating number, the call module 76d makes a call with a predetermined number of rings to the portable telephone 71 (Step S25). After a predetermined number of rings, when the user 61 instructs to make a callback, the callback module 71b of the portable telephone 71 makes a callback (Step S26). Accordingly, the call module 76d determines whether an originating number of the callback matches an originating number to which the call has been made. If there is a match, the call module 76d sends a talkie message requesting return of characters (Step S27).

When the user 61 hears the talkie message and dials characters and the portable telephone 71 returns the characters (Step S28), determination is made as to whether the returned characters match the characters specified in the talkie message ("1#"). If there is a match, the file server 86 is notified that the user is an authorized user (Step S29). Accordingly, the authentication module 86b of the file server 86 provides login permission to the PC 62 (Step S30).

As such, upon receiving a user authentication request, the call module 76d of the authentication server 76 makes a call to the portable telephone 71. This enables the user 61 to perform authentication by making a callback, thus reducing the burden on the user 61 for user authentication.

As described, in the second embodiment, the authentication server 76 performs user authentication in response to a user authentication request from a service system. This eliminates the need to provide a user authentication function in each service system, thus enabling to efficiently establish a user authentication system.

The first and the second embodiments describe user authentication functions of a service provider server and an authentication server. Such user authentication functions are realized by a user authentication program executed by a service provider server and an authentication server. The following describes a hardware configuration of a service provider server and an authentication server that execute this user authentication program.

Figure 7:
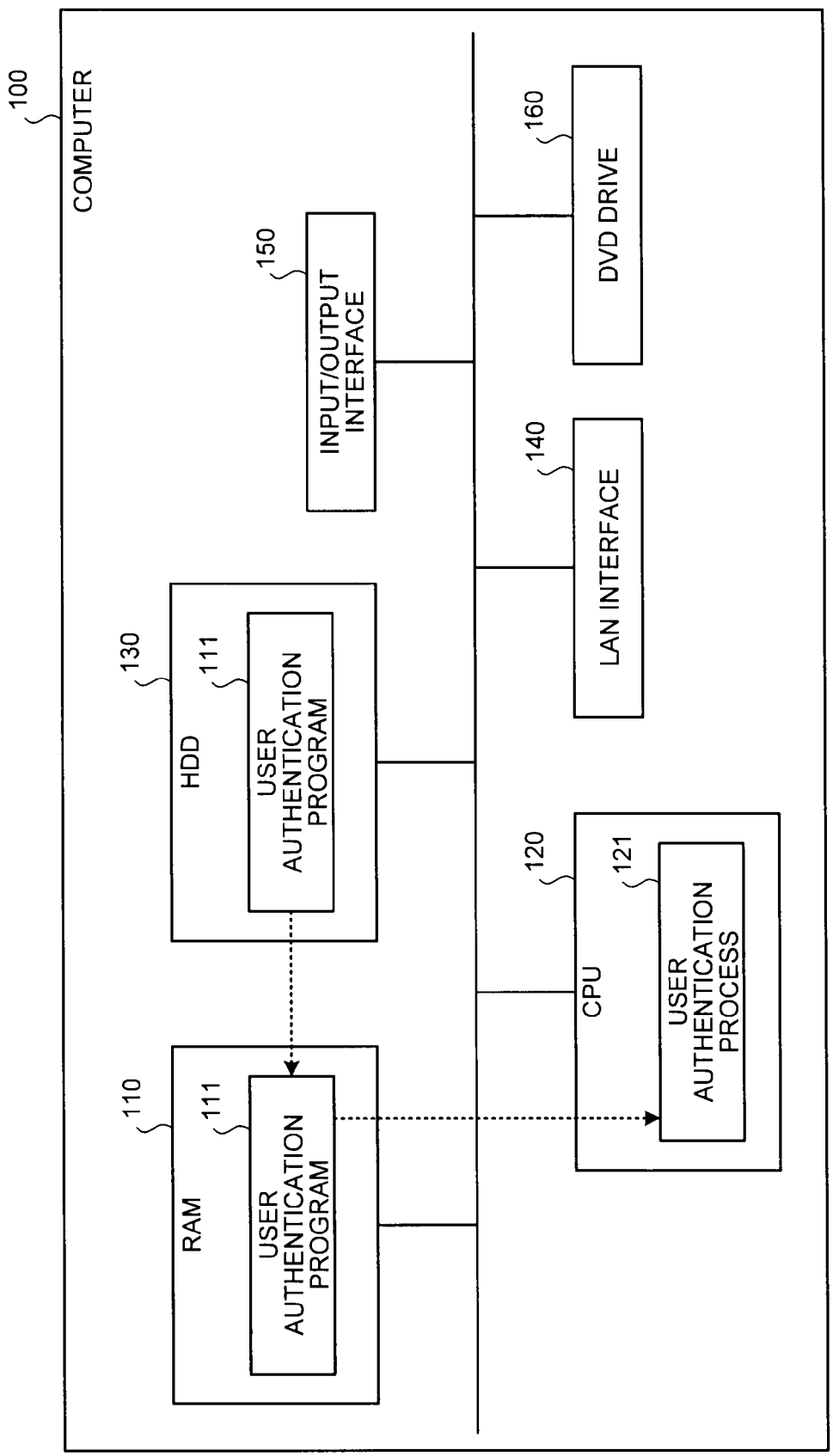
FIG. 7 is a block diagram of a hardware configuration of a computer that executes a user authentication program according to the first and the second embodiments.

FIG. 7 is a block diagram of a hardware configuration of a computer that executes a user authentication program according to the first and the second embodiments, i.e., a service provider server and an authentication server. As shown in FIG. 7, a computer 100 includes a random access memory (RAM) 110, a central processing unit (CPU) 120, a hard disk device (HDD) 130, a local area network (LAN) interface 140, an input/output interface 150, and a digital versatile disk (DVD) drive 160.

The RAM 110 is a memory that stores therein a computer program and a result of execution of a computer program. The CPU 120 is a central processor that reads out a computer program from the RAM 110 and executes it.

The HDD 130 is a disk device that stores therein a computer program and data. The LAN interface 140 is an interface for connecting the computer 100 to other computers via the LAN and the internet 65.

The input/output interface 150 is an interface to an input device such as a mouse or a keyboard, and a display. The DVD drive 160 reads from and writes to a DVD.

A user authentication program 111 executed on the computer 100 is stored in a DVD, read out from the DVD by the DVD drive 160, and installed on the computer 100.

Alternatively, the user authentication program 111 may be stored in databases of other computer systems connected via the LAN interface 140, read out from the databases, and installed on the computer 100.

The installed user authentication program 111 is stored in the HDD 130, loaded into the RAM 110, and executed by the CPU 120 in a user authentication process 121.

The first and the second embodiments describe user authentication using a service system via the Internet. The present invention is not limited to this, and may be similarly applied to other user authentication, for example, user authentication at automatic teller machines (ATM).

Industrial Applicability

As described above, a method, system, apparatus, and computer program for user authentication according to the present invention are useful for user authentication, i.e., for identifying whether a user is an authorized user, and are particularly suitable for user authentication where importance is given to reducing the user's burden.

The invention claimed is:

1. A user authentication method applied to a user authentication apparatus for authentication using a unique ID that is information unique to a communication apparatus used by a user, the user authentication method comprising:
    acquiring, from a user, a user ID as information identifying the user;
    detecting a unique ID corresponding to the user ID acquired at the acquiring from a user ID list indicating a corresponding relationship between the user ID and the unique ID;
    recording an originating ID in a incoming call history of a communication apparatus having the unique ID detected at the detecting by making a call with a predetermined number of rings to a communication apparatus having the unique ID detected at the detecting;
    when the call is answered within the predetermined number of rings, disconnecting the call immediately; and
    when the call is not answered by the user after the predetermined number of rings, and a callback is received, the callback being made by the communication apparatus after the predetermined number of rings of the call in response to the call using the originating ID recorded in the incoming call history, determining whether a unique ID of the communication apparatus having made the callback received at the receiving matches the unique ID of the communication apparatus to which the call has been made, and determining, if there is a match, that the user having the user ID acquired at the acquiring is an authorized user.

2. The user authentication method according to claim 1, further comprising
    randomly selecting one originating ID from among a plurality of originating IDs to be used by the user authentication apparatus for making a call, wherein the making includes making the call using the originating ID selected at the originating ID selecting step.

3. The user authentication method according to claim 1, wherein the communication apparatus is a telephone, and the unique ID is a telephone number.

4. The user authentication method according to claim 1, further comprising:
    sending a message indicating characters to the communication apparatus having made the callback, if there is a match between the unique ID of the communication apparatus having made the callback and the unique ID of the communication apparatus to which the call has been made;
    receiving characters from the communication apparatus having made the callback; and
    determining, if there is a match between the indicated characters and the received characters, that the user having the user ID acquired at the acquiring is the authorized user.

5. A user authentication method applied to a user authentication apparatus for user authentication using a unique ID that is information unique to a communication apparatus used by a user, the user authentication method comprising:
    receiving a user authentication request together with a user ID as information identifying a user from an apparatus that requires user authentication;
    detecting, from a user ID list, a unique ID corresponding to the user ID received together with the user authentication request at the receiving a user authentication request, the user ID list indicating a corresponding relationship between the user ID and the unique ID;
recording an originating ID in an incoming call history of a communication apparatus having the unique ID detected at the detecting by making a call with a predetermined number of rings to a communication apparatus having the unique ID detected at the detecting;
when the call is answered within the predetermined number of rings, disconnecting the call immediately; and
when the call is not answered by the user after the predetermined number of rings, and a callback is received, the callback being made by the communication apparatus after the predetermined number of rings of the call in response to the call using the originating ID recorded in the incoming call history, determining whether a unique ID of the communication apparatus having made the callback received at the receiving a callback matches the unique ID to which the call has been made, and notifying, if there is a match, the apparatus that requires user authentication that the user is an authorized user.

6. A user authentication system, comprising:
a communication apparatus used by a user, and
a service system that performs authentication by using a unique ID that is information unique to the communication apparatus, wherein
the service system comprises
  a user ID list storage module that stores therein a user ID list indicating a corresponding relationship between a user ID as information identifying the user and the unique ID;
  a user ID acquiring module that acquires a user ID from the user;
  a unique ID detection module that detects, from the user ID list storage module, a unique ID corresponding to the user ID acquired by the user ID acquiring module;
  a calling module that records an originating ID in an incoming call history of a communication apparatus having the unique ID detected by the unique ID detection module by making a call with a predetermined number of rings to a communication apparatus having the unique ID detected by the unique ID detection module, and disconnects the call immediately when the call is answered within the predetermined number of rings;
  a callback receiving module that, when the call is not answered by the user after the predetermined number of rings, receives a callback made by a communication apparatus after the predetermined number of rings of the call in response to the call made by the calling module using the originating ID recorded in the incoming call history; and
  a user determining module that determines whether a unique ID of the communication apparatus having made the callback received by the callback receiving module matches the unique ID to which the call has been made, and that determines, if there is a match, that the user having the user ID acquired by the user ID acquiring module is an authorized user, and
the communication apparatus comprises
  a callback module that makes a callback, based on an instruction made from the user, after a predetermined number of rings of the call in response to the call made by the calling module using the originating ID recorded in the incoming call history.

7. A user authentication system, including:
a communication apparatus used by a user, a service system providing a service to the user, and
an authentication apparatus that performs, in response to a user authentication request from the service system, user authentication by using a unique ID that is information unique to the communication apparatus, wherein
the authentication apparatus comprises
  a user ID list storage module that stores therein a user ID list indicating a corresponding relationship between a user ID as information identifying the user and the unique ID;
  a user ID acquiring module that acquires a user ID together with the user authentication request from the service system;
  a unique ID detection module that detects, from the user ID list storage module, a unique ID corresponding to the user ID acquired by the user ID acquiring module;
  a calling module that records an originating ID in an incoming call history of a communication apparatus having the unique ID detected by the unique ID detection module by making a call with a predetermined number of rings to a communication apparatus having the unique ID detected by the unique ID detection module, and disconnects the call immediately when the call is answered within the predetermined number of rings;
  a callback receiving module that, when the call is not answered by the user after the predetermined number of rings, receives a callback made by a communication apparatus after the predetermined number of rings of the call in response to the call made by the calling module; and
  a user determining module that determines whether a unique ID of the communication apparatus having made the callback received by the callback receiving module matches the unique ID to which the call has been made, and that notifies, if there is a match, the service system that the user having the user ID acquired by the user ID acquiring module is an authorized user, and
the communication apparatus comprises
  a callback module that makes a callback, based on an instruction made from the user, after a predetermined number of rings of the call in response to the call made by the calling module using the originating ID recorded in the incoming call history.

8. A user authentication apparatus that performs authentication by using a unique ID that is information unique to a communication apparatus used by a user, the user authentication apparatus comprising:
  a user ID list storage module that stores therein a user ID list indicating a corresponding relationship between a user ID as information identifying the user and the unique ID;
  a user ID acquiring module that acquires a user ID from the user;
  a unique ID detection module that detects, from the user ID list storage module, a unique ID corresponding to the user ID acquired by the user ID acquiring module;
  a calling module that records an originating ID in an incoming call history of a communication apparatus having the unique ID detected by the unique ID detection module by making a call with a predetermined number of rings to a communication apparatus having the unique ID detected by the unique ID detection module, and disconnects the call immediately when the call is answered within the predetermined number of rings;

a callback receiving module that, when the call is not answered by the user after the predetermined number of rings, receives a callback made by a communication apparatus after the predetermined number of rings of the call in response to the call made by the calling module using the originating ID recorded in the incoming call history; and a user determining module that determines whether a unique ID of the communication apparatus having made the callback received by the callback receiving module matches the unique ID to which the call has been made, and that determines, if there is a match, that the user having the user ID acquired by the user ID acquiring module is an authorized user.

9. A user authentication apparatus that performs user authentication by using a unique ID that is information unique to a communication apparatus used by a user, the user authentication apparatus comprising:

a user ID list storage module that stores therein a user ID list indicating a corresponding relationship between a user ID as information identifying the user and the unique ID;

a user authentication request receiving module that receives a user authentication request together with the user ID from an apparatus that requires user authentication;

a unique ID detection module that detects, from the user ID list storage module, a unique ID corresponding to the user ID received by the user authentication request receiving module;

a calling module that records an originating ID in an incoming call history of a communication apparatus having the unique ID detected at the detecting by making a call with a predetermined number of rings to a communication apparatus having the unique ID detected by the unique ID detection module, and disconnects the call immediately when the call is answered within the predetermined number of rings;

a callback receiving module that, when the call is not answered by the user after the predetermined number of rings, receives a callback made by a communication apparatus after the predetermined number of rings of the call in response to the call made by the calling module using the originating ID recorded in the incoming call history; and a user determining module that determines whether a unique ID of the communication apparatus having made the callback received by the callback receiving module matches the unique ID to which the call has been made, and that notifies, if there is a match, the apparatus that requires user authentication that the user is an authorized user.

10. A computer program product comprising a non-transitory computer readable medium having computer readable program codes embodied in the medium that, when executed, implements authentication by using a unique ID that is information unique to a communication apparatus used by a user, the computer readable program codes causing a computer to perform:

acquiring, from a user, a user ID as information identifying the user;

detecting a unique ID corresponding to the user ID acquired at the acquiring from a user ID list indicating a corresponding relationship between the user ID and the unique ID;

recording an originating ID in an incoming call history of a communication apparatus having the unique ID detected at the detecting by making a call with a predetermined number of rings to a communication apparatus having the unique ID detected at the detecting;

when the call is answered within the predetermined number of rings, disconnecting the call immediately; and when the call is not answered by the user after the predetermined number of rings, and a callback is received the callback being made by the communication apparatus after the predetermined number of rings of the call in response to the call using the originating ID recorded in the incoming call history, determining whether a unique ID of the communication apparatus having made the callback received at the receiving matches the unique ID of the communication apparatus to which the call has been made, and determining, if there is a match, that the user having the user ID acquired at the acquiring is an authorized user.

11. A computer program product comprising a non-transitory computer readable medium having computer readable program codes embodied in the medium that, when executed, implements user authentication by using a unique ID that is information unique to a communication apparatus used by a user, the computer readable program codes causing a computer to perform:

receiving a user authentication request together with a user ID as information identifying a user from an apparatus that requires user authentication;

detecting, from a user ID list, a unique ID corresponding to the user ID received together with the user authentication request at the receiving a user authentication request, the user ID list indicating a corresponding relationship between the user ID and the unique ID;

recording an originating ID in an incoming call history of a communication apparatus having the unique ID detected at the detecting by making a call with a predetermined number of rings to a communication apparatus having the unique ID detected at the detecting;

when the is answered within the predetermined number of rings, disconnecting the call immediately; and when the call is not answered by the user after the predetermined number of rings, and a callback is received, the callback being made by the communication apparatus after the predetermined number of rings of the call in response to the call using the originating ID recorded in the incoming call history, determining whether a unique ID of the communication apparatus having made the callback received at the receiving a callback matches the unique ID to which the call has been made, and notifying, if there is a match, the apparatus that requires user authentication that the user is an authorized user.

* * * * *